United States Patent
Kresse et al.

(10) Patent No.: US 7,864,675 B2
(45) Date of Patent: Jan. 4, 2011

(54) AUTOMATION DEVICE

(75) Inventors: Heiko Kresse, Obernkirchen (DE); Andreas Stelter, Minden (DE); Ralf Schaeffer, Hille (DE)

(73) Assignee: ABB AG, Ladenburg (DE)

( * ) Notice: Subject to any disclaimer, the term of this patent is extended or adjusted under 35 U.S.C. 154(b) by 1116 days.

(21) Appl. No.: 11/520,158

(22) Filed: Sep. 13, 2006

(65) Prior Publication Data

US 2007/0116040 A1 May 24, 2007

(30) Foreign Application Priority Data

Sep. 13, 2005 (DE) .................. 10 2005 043 483

(51) Int. Cl.
*H04L 27/14* (2006.01)
(52) U.S. Cl. .................. 370/230; 370/431; 370/466; 375/334
(58) Field of Classification Search .................. 370/252, 370/431, 465, 272; 329/303
See application file for complete search history.

(56) References Cited

U.S. PATENT DOCUMENTS

| | | | | | |
|---|---|---|---|---|---|
| 4,287,565 | A | * | 9/1981 | Haubner et al. | 700/293 |
| 4,533,874 | A | * | 8/1985 | Fischer | 329/303 |
| 4,541,110 | A | * | 9/1985 | Hopf et al. | 704/231 |
| 7,358,781 | B2 | * | 4/2008 | Kresse et al. | 327/113 |
| 7,359,812 | B2 | * | 4/2008 | Kresse et al. | 702/79 |
| 7,386,052 | B2 | * | 6/2008 | Kresse et al. | 375/245 |
| 7,447,552 | B2 | * | 11/2008 | Kresse et al. | 700/2 |
| 2007/0115851 | A1 | * | 5/2007 | Kresse et al. | 370/252 |
| 2007/0115852 | A1 | * | 5/2007 | Kresse et al. | 370/252 |
| 2007/0116133 | A1 | * | 5/2007 | Kresse et al. | 375/257 |
| 2007/0118232 | A1 | * | 5/2007 | Kresse et al. | 700/11 |
| 2007/0118233 | A1 | * | 5/2007 | Kresse et al. | 700/11 |
| 2007/0118686 | A1 | * | 5/2007 | Kresse et al. | 711/108 |
| 2007/0126498 | A1 | * | 6/2007 | Kresse et al. | 329/300 |
| 2007/0129904 | A1 | * | 6/2007 | Kresse et al. | 702/79 |
| 2007/0136538 | A1 | * | 6/2007 | Kresse et al. | 711/154 |
| 2007/0150625 | A1 | * | 6/2007 | Kresse et al. | 710/62 |
| 2007/0150626 | A1 | * | 6/2007 | Kresse et al. | 710/62 |

* cited by examiner

*Primary Examiner*—Seema S Rao
*Assistant Examiner*—Mon Cheri S Davenport
(74) *Attorney, Agent, or Firm*—Michael M. Rickin; Paul R. Katterle; Michael C. Prewitt

(57) ABSTRACT

The invention relates to an automation device (100, 100'), with which a multiplicity of physically distributed functional units communicate with each other by means of a common transmission protocol. The device has a microcontroller (110), which is assigned at least one clock generator (120) and one memory unit (150), and which is connected at least to one data source (140), which is designed to output a data bit-stream to be transmitted.

6 Claims, 2 Drawing Sheets

AUTOMATION DEVICE

CROSS REFERENCE TO RELATED APPLICATION

This application claims priority from German Application DE 10 2005 043 483.5 filed on Sep. 13, 2005 the contents of which are relied upon and incorporated herein by reference in their entirety, and the benefit of priority under 35 U.S.C. 119 is hereby claimed.

BACKGROUND OF THE INVENTION

The invention relates to an automation device, with which a multiplicity of physically distributed functional units communicate with each other by means of a common transmission protocol. These functional units manifest themselves as field devices or operator units according to their automation function.

For some time now it has been common practice in instrumentation and control engineering to use a two-wire line to supply a field device and to transfer measurements from this field device to a display device and/or to an automation control system, or transfer control values from an automation control system to the field device. Each measurement or control value is converted into a proportional DC current, which is superimposed on the DC supply current, where the DC current representing the measurement or control value can be a multiple of the DC supply current. Thus the supply current consumption of the field device is usually set to approximately 4 mA, and the dynamic range of the measurement or control value is mapped onto currents between 0 and 16 mA, so that the known 4 to 20 mA current loop can be used.

More recent field devices also feature universal properties that are largely adaptable to the given process. For this purpose, an AC transmission path capable of bi-directional operation is provided in parallel with the unidirectional DC transmission path, via which parameterization data are transferred in the direction to the field device and measurements and status data are transferred from the direction of the field device. The parameterization data and the measurements and status data are modulated on an AC voltage, preferably frequency modulated.

In process control engineering, it is common in the field area as it is called, to arrange and link field devices, i.e. measurement, control and display modules, locally according to the specified safety requirements. These field devices have analog and digital interfaces for data transfer between them, where data transfer takes place via the supply lines of the power supply arranged in the control area. Operator units are also provided in the control area, as it is called, for controlling and diagnosing these field devices remotely, where lower safety requirements normally apply.

Data transfer between the operator units in the control area and the field devices is implemented using FSK modulation (Frequency Shift Keying) superimposed on the known 20 mA current loops, where two frequencies, assigned to the binary states "0" and "1", are transferred in frames as analog signals.

The general conditions for the FSK signal and the type of modulation are specified in the "HART Physical Layer Specification Revision 7.1-Final" dated Jun. 20, 1990 (Rosemount Document no. D8900097; Revision B).

ASICs specifically developed to implement the FSK interface according to the HART protocol, such as the HT2012 from the SMAR company, are commercially available and in common use. The disadvantage with these special circuits is the permanently fixed range of functions and the associated lack of flexibility to adapt to changing requirements.

Known modern automation devices are usually equipped with a processing unit known as a microcontroller, which is used to perform the correct data processing for the automation task of the functional unit concerned.

The aim is to reproduce the functions of the FSK interface according to the HART protocol in the controller of the processing unit of the automation devices, without impairing in the process the automation task of the functional unit concerned.

SUMMARY OF THE INVENTION

Hence the object of the invention is specifically to define an automation device having means for converting an FSK signal into a data bit-stream using a microcontroller known per se.

The invention is based on an automation device having a processing unit, which is assigned at least one memory unit for storing instructions and data. Connected to this processing unit on the transmit side is a digital-to-analog converter whose output is connected to a filter.

The data bit-stream is transmitted by means of two signal frequencies which are assigned to the binary states "0" and "1" and are keyed according to the data bit sequence.

To reconstruct the transmitted data bit-stream from the FSK-modulated line signal, provision is made of a zero crossover detector which has a first, a second and a third retriggerable monoflop connected in parallel downstream of it. The first retriggerable monoflop has a hold time which is shorter than half the period duration of the higher signal frequency. The second retriggerable monoflop has a hold time which is shorter than half the period duration of the lower signal frequency and longer than half the period duration of the higher signal frequency. The third retriggerable monoflop has a hold time which is longer than half the period duration of the lower signal frequency.

The outputs of the first, second and third monoflops are connected to an evaluation stage in which a data bit is determined and output on the basis of the output states of the first, second and third monoflops.

According to a further feature of the invention, the monoflops are formed by timer channels of the microcontroller. Reconstruction of the transmitted data bit-stream advantageously manages with a few components.

According to a further feature of the invention, the monoflops are formed by time loops in the program execution of the microcontroller. Therefore, the invention can also be implemented using those microcontrollers whose number of available timer channels is excessively small.

BRIEF DESCRIPTION OF THE DRAWINGS

The invention is explained in more detail below with reference to an exemplary embodiment. In the drawings required for this, FIG. 1 shows schematically an automation device 100 to the extent necessary to understand the present invention.

DETAILED DESCRIPTION OF ILLUSTRATIVE EMBODIMENTS

Figure 1:
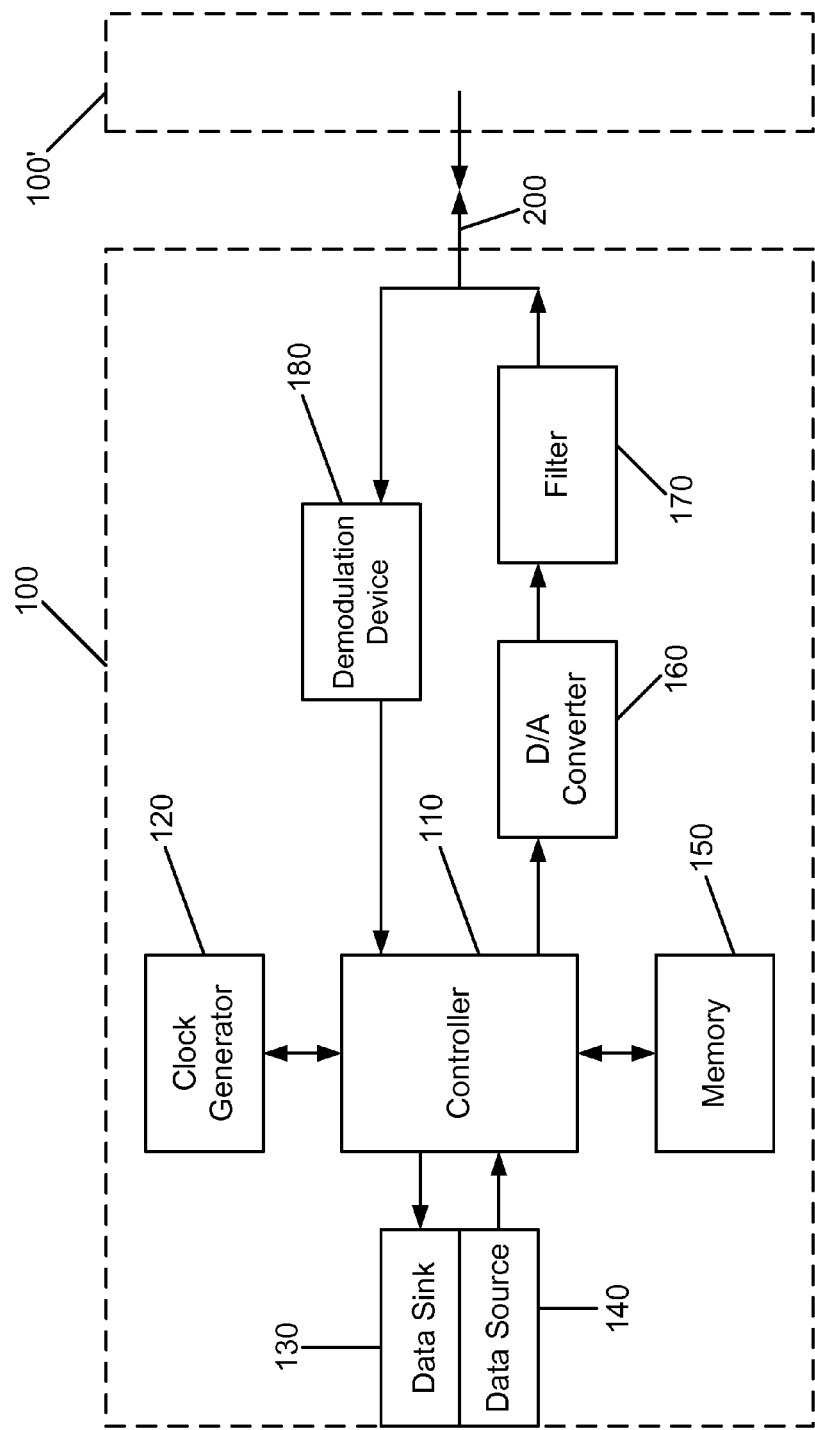
FIG. 1 shows a block diagram of an automation device
Figure 2:
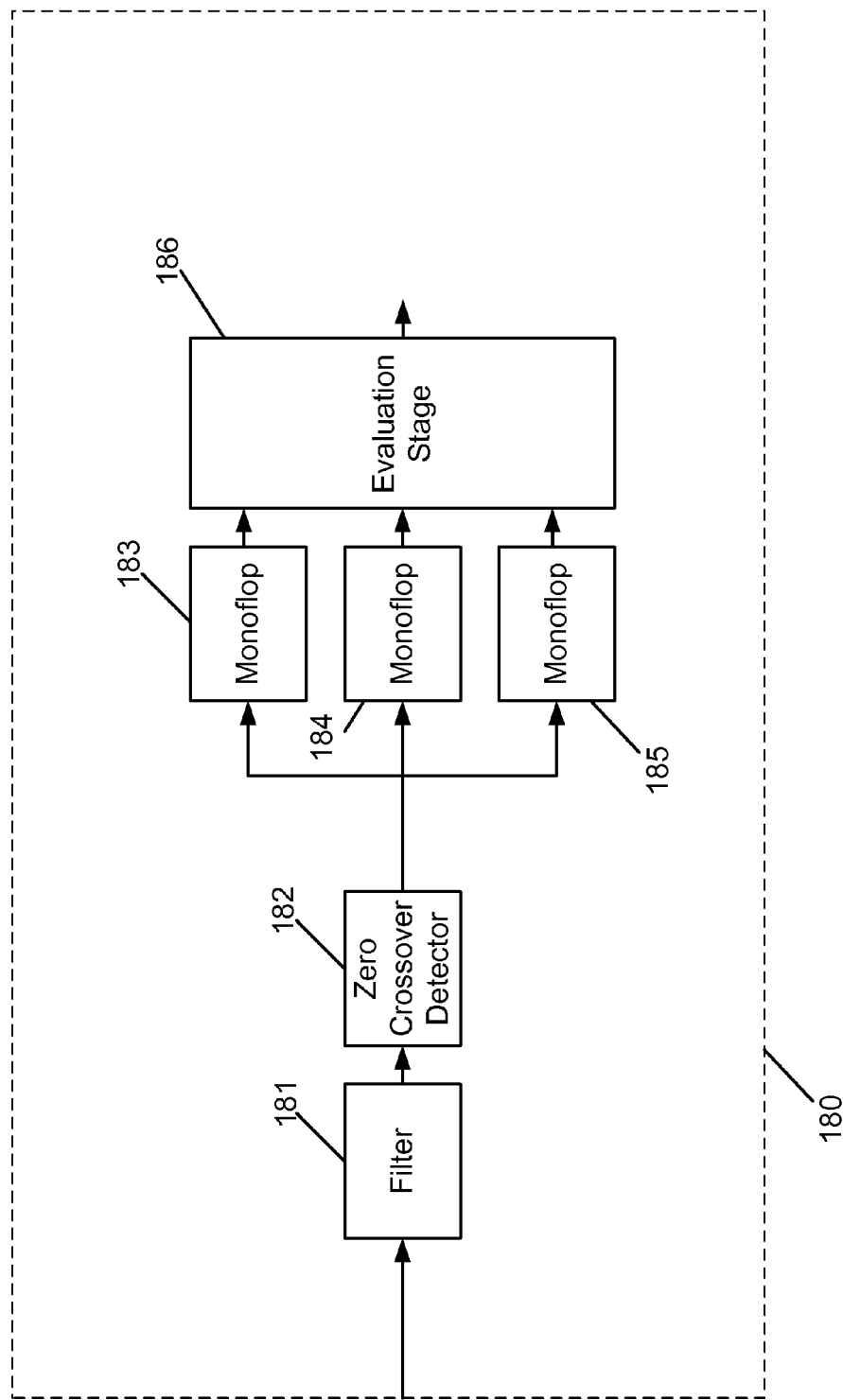
FIG. 2 shows a schematic diagram for converting an FSK signal into a data bit-stream

The automation device 100 is connected via a communications line 200 to an automation device 100' of substantially the same type. The communications line 200 is used bi-directionally. The information sent by the automation device 100 is received by the automation device 100', and vice versa. Hence reference is only made below to the automation device 100 shown in detail.

A core component of the automation device 100 is a controller 110, which is connected at least to one memory unit 150 and one timing element, referred to below as a clock generator 120 for the sake of simplicity. Usually, however, parts of the clock generator 120 are already implemented in the controller 110.

The controller 110 has connections for connecting a data sink 130 and a data source 140.

A configurable and/or parameterizable sensor for converting a physical variable into an electrical variable can be provided as the data source 140, in which case the configuration and/or parameterization is the data sink 130.

In an alternative embodiment, it can be provided that the data sink 130 is an actuator for converting an electrical variable into a physical variable whose properties can be diagnosed. The diagnostic device provided for this purpose is then the data source 140.

In a further embodiment, it can be provided that the automation device 100 is part of a higher-level device designed for bi-directional communication with additional automation devices 100'. In this embodiment, the higher-level device is both the data source 140 and the data sink 130.

In a further embodiment, the automation device 100 can be designed as a "protocol converter". In this embodiment, the data source 140 and the data sink 130 are formed by a second communications system.

To implement the invention, however, it is sufficient for the data source 140 to be present without the data sink 130.

In addition, connected to the controller 110 is a digital-to-analog converter 160 whose output is connected to a filter 170. The output of the filter 170 is connected to the communications line 200. In addition, the communications line 200 is taken to the input terminals of the controller 110, via which terminals it is provided that the line signal 201 on the communications line 200 is received.

Starting from the communications line 200, the automation device has a demodulation device 180 at the receive end. The demodulation device 180 essentially comprises a zero-crossover detector 182 for detecting the zero crossover of the line signal, a first, a second and a third retriggerable monoflop being connected in parallel downstream of said detector.

The first retriggerable monoflop 183 has a hold time which is shorter than half the period duration of the higher signal frequency. The second retriggerable monoflop 184 has a hold time which is shorter than half the period duration of the lower signal frequency and longer than half the period duration of the higher signal frequency. The third retriggerable monoflop 185 has a hold time which is longer than half the period duration of the lower signal frequency.

The outputs of the first, second and third monoflops 183, 184 and 185 are connected to an evaluation stage 186 in which a data bit is determined and output on the basis of the output states of the first, second and third monoflops 183, 184 and 185.

It is assumed below that the lower signal frequency is provided for transmitting a logic "1" and the higher signal frequency is provided for transmitting a logic "0". A logic "0" is detected from the return of the second monoflop 184 to the position of rest while the first monoflop 183 is simultaneously held. A logic "1" is detected from the return of the third monoflop 185 to the position of rest while the second monoflop 184 is simultaneously held.

In a special embodiment of the invention, the monoflops 183, 184 and 185 are formed by timer channels of the microcontroller 110. Reconstruction of the transmitted data bit-stream advantageously manages with a few components.

In an alternative embodiment of the invention, the monoflops 183, 184 and 185 are formed by time loops in the program execution of the microcontroller 110. Therefore, the invention can also be implemented using those microcontrollers 110 whose number of available timer channels is excessively small.

According to a further feature of the invention, a filter 181 is connected to the input of the zero-crossover detector, thereby removing interference signals from the line signal.

What is claimed is:

1. An automation device, with which a multiplicity of physically distributed functional units communicate with each other by means of a common transmission protocol, having a microcontroller, which is assigned at least one clock generator and one memory unit, and which is connected at least to one data sink, which is designed to accept a received data bit-stream, and to which is input an FSK-modulated line signal having a higher signal frequency and a lower signal frequency, wherein said automation device comprises:
   a zero-crossover detector (182),
   a plurality of monoflops connected in a parallel manner to the zero-crossover detector (182), the plurality of monoflops comprising:
   a. a first retriggerable monoflop (183) having a hold time that is shorter than half a period duration of the higher signal frequency,
   b. a second retriggerable monoflop (184) having a hold time that is shorter than half a period duration of the lower signal frequency and longer than half the period duration of the higher signal frequency, and
   c. a third retriggerable monoflop (185) having a hold time that is longer than half the period duration of the lower signal frequency, and
   an evaluation stage (186) connected to the outputs of the first, second and third monoflops (183, 184, 185), wherein in the evaluation stage (186) a data bit is determined and output on the basis of the output states of the first, second and third monoflops (183, 184, 185).

2. The automation device as claimed in claim 1, wherein the monoflops (183, 184, 185) are formed by timer channels of the microcontroller (110).

3. The automation device as claimed in claim 1, wherein the monoflops (183, 184, 185) are formed by time loops in a program execution of the microcontroller (110).

4. The automation device of claim 1, wherein the automation device further comprises a data source.

5. The automation device of claim 4, wherein the data source comprises a configurable sensor for converting a physical variable into an electrical variable, and wherein the at least one data sink comprises a configuration of the sensor.

6. The automation device of claim 4, wherein the at least one data sink comprises an actuator for converting an electrical variable into a physical variable whose properties can be diagnosed, and wherein the data source comprises a diagnostic device for diagnosing the physical variable.

* * * * *